United States Patent [19]

Johnson

[11] Patent Number: 5,696,579
[45] Date of Patent: Dec. 9, 1997

[54] METHOD, APPARATUS AND SYSTEM FOR DETERMINING THE DIFFERENTIAL RATE OF CHANGE OF STRAIN

[75] Inventor: Bartley Clark Johnson, Clayton, Mo.

[73] Assignee: McDonnell Douglas

[21] Appl. No.: 526,114

[22] Filed: Sep. 8, 1995

[51] Int. Cl.[6] .................................................. G01B 9/02
[52] U.S. Cl. ........................... 356/35.5; 356/345; 356/352
[58] Field of Search ................................. 356/345, 349, 356/352, 35.5; 250/227.19, 227.27

[56] References Cited

U.S. PATENT DOCUMENTS

| | | |
|---|---|---|
| 3,795,448 | 3/1974 | Fletcher et al. . |
| 4,525,067 | 6/1985 | Hernandez . |
| 4,755,668 | 7/1988 | Davis ............................ 250/227.19 |
| 4,799,797 | 1/1989 | Huggins ............................ 356/345 |
| 4,818,071 | 4/1989 | Dyott ............................ 356/349 |
| 4,832,492 | 5/1989 | Calvani et al. ............................ 356/349 |
| 4,889,986 | 12/1989 | Kersey et al. . |
| 4,906,092 | 3/1990 | O'Meara ............................ 356/28.5 |
| 4,974,961 | 12/1990 | Jackson et al. ............................ 356/345 |
| 5,106,192 | 4/1992 | Tucker et al. ............................ 356/349 |
| 5,140,154 | 8/1992 | Yurek et al. . |
| 5,173,743 | 12/1992 | Kim . |
| 5,178,153 | 1/1993 | Einzig ............................ 356/352 |
| 5,202,939 | 4/1993 | Belleville et al. ............................ 385/12 |
| 5,216,532 | 6/1993 | Taylor . |
| 5,231,611 | 7/1993 | Laznicka, Jr. . |
| 5,272,513 | 12/1993 | Vahala et al. . |

Primary Examiner—Samuel A. Turner
Attorney, Agent, or Firm—Dale B. Halling

[57] ABSTRACT

An apparatus (60) or system (30) for determining a differential time derivative of strain in a device that has a low coherence light source (32) coupled to a plurality of Fabry-Perot etalons (62). The reflected signals from the Fabry-Perot etalons are coupled to a beam splitter (44) or acousto-optic modulator (66). A first beam (48) and a second beam (50) from the output (46) of the beam splitter (44) are combined in at least one interferometer (52, 64). The outputs of the interferometers (64) are detected by a plurality of detectors (124). The outputs of the detectors (124) are coupled to a plurality of FM demodulators (127). The output of the FM demodulators (127) are a plurality of signals proportional to the difference in the time derivative strain at the pair of mirrors (94, 96) of one of the Fabry-Perot etalons (62)

31 Claims, 9 Drawing Sheets

METHOD, APPARATUS AND SYSTEM FOR DETERMINING THE DIFFERENTIAL RATE OF CHANGE OF STRAIN

The Government has rights in this invention pursuant to Contract No. MDA972-90-C-0026 awarded by the United States Navy.

FIELD OF THE INVENTION

The present invention relates generally to strain measurements, and more particularly to a method, apparatus and system for determining the differential rate of change of strain.

BACKGROUND OF THE INVENTION

A number of optical systems have been designed to measure strain. A common system has a Fabry-Perot etalon attached to the device undergoing strain. A Fabry-Perot etalon consists of two parallel partially reflecting mirrors separated by a fixed distance. The Fabry-Perot etalon is connected to a laser by an optical fiber. As strain is applied to the device under test the Fabry-Perot etalon is stretched, changing its optical path length. This change in the Fabry-Perot etalon's optical path length results in movement of the fringes at the detector. By counting the number of fringes that have moved past a point at the output of the interferometer the change in strain can be determined. When the device is undergoing very rapid strain it is difficult to keep track of the number of fringes passing through the output and the sign (direction) of the strain. In addition, this system does not determine the instantaneous rate at which the strain is changing.

Laser Doppler velocity sensors for non-contact vibration measurements exist. A laser beam is split into a sensor beam and a reference beam. The sensor beam bounces off a vibrating surface and then is mixed with the reference beam. The mixing process results in a signal with a frequency equal to the Doppler shift. As a result, the velocity of the vibrating surface can be determined. This signal shows the vibration of the surface (position verses time) or can be related to the derivative of the strain undergone by the surface with respect to time. This sensor is not adaptable to measure the time derivative of strain within an object nor can it measure the time derivative of strain at several points within a device.

Thus there exists a need for a system that can determine the time derivative of strain within a device. There also is a need to determine the time derivative of strain at several points within a device.

SUMMARY OF THE INVENTION

A system that overcomes these problems has a low coherence light source that illuminates a pair of reflective targets. The reflections from the pair of reflective targets are coupled to a beam splitter having at its output a pair of beams. The pair of beams are combined in an interferometer.

In another embodiment, the pair of reflective targets are the mirrors of a Fabry-Perot etalon and several of the Fabry-Perot etalons are illuminated by the low coherence light source. The reflections from the Fabry-Perot etalons are coupled to the beam splitter. The output from the beam splitter is coupled to an interferometer.

In another embodiment, a coherent light source is split into a pair of beams. One of the pair of beams is transmitted by an optical fiber to a first sensor and the other of the pair of beams is transmitted by another optical fiber to a second sensor. A detector is coupled to the output of the first sensor and the second sensor.

DETAILED DESCRIPTION OF THE DRAWINGS

The structures of the various embodiments of the invention are described first. A description of the physical principles underlying the invention are then explained using more detailed drawings of the embodiments. The basic theory behind the invention is to detect the difference in the Doppler shift between two reflective targets.

Figure 1:
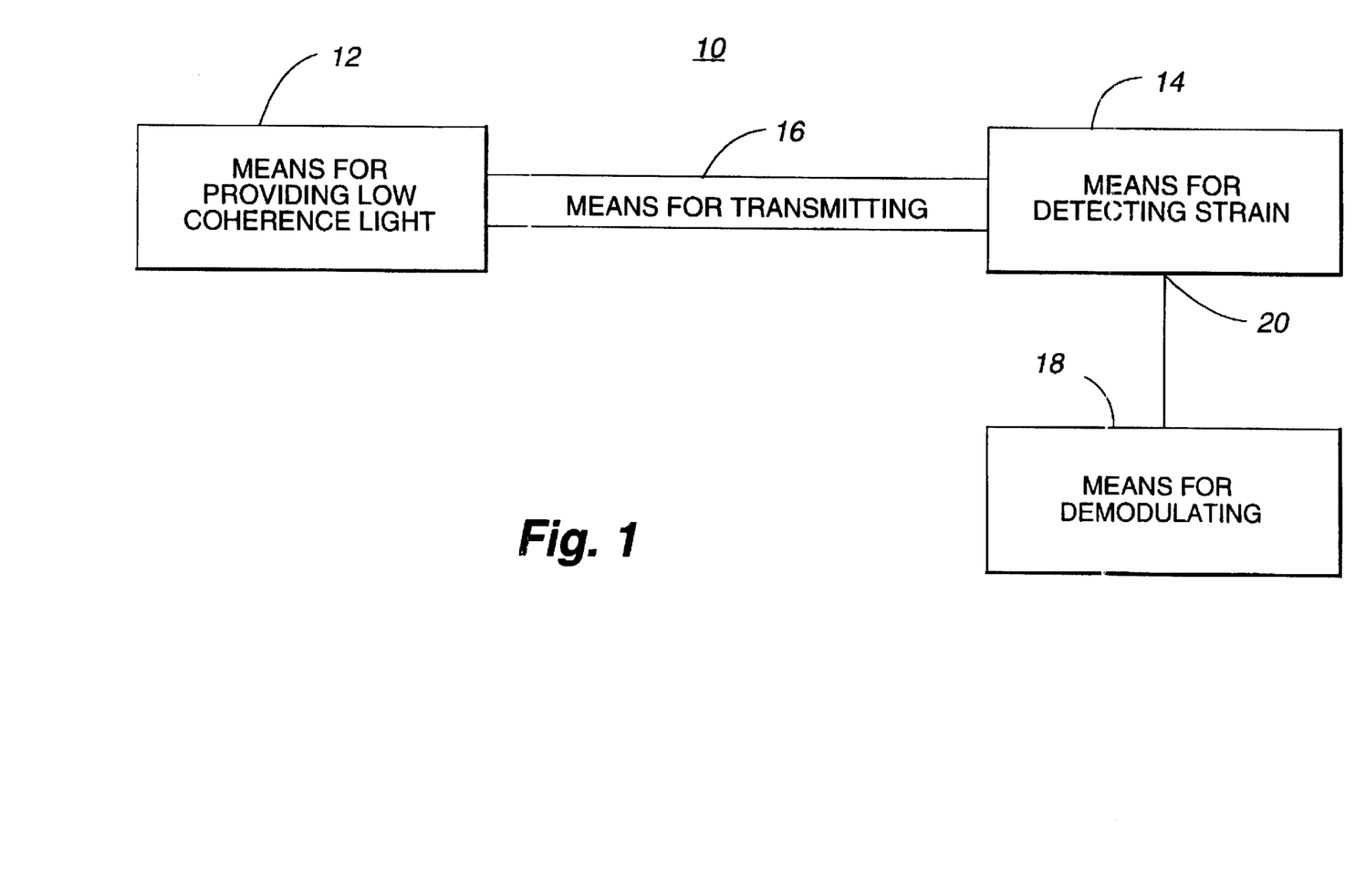
FIG. 1 is a block diagram of an apparatus for measuring a differential rate of change in strain.

An apparatus 10 for measuring a differential rate of change in strain is shown in FIG. 1. A means for providing a low coherence light 12 is coupled to a means for detecting strain 14 by a means for transmitting 16. The means for detecting strain 14 is attached to the device under test and is connected to a means for demodulating 18. The means for demodulating 18 is connected to an output 20 of the means for detecting 14 and converts the output 20 to a visual or audible output of the differential rate of change in strain.

Figure 2:
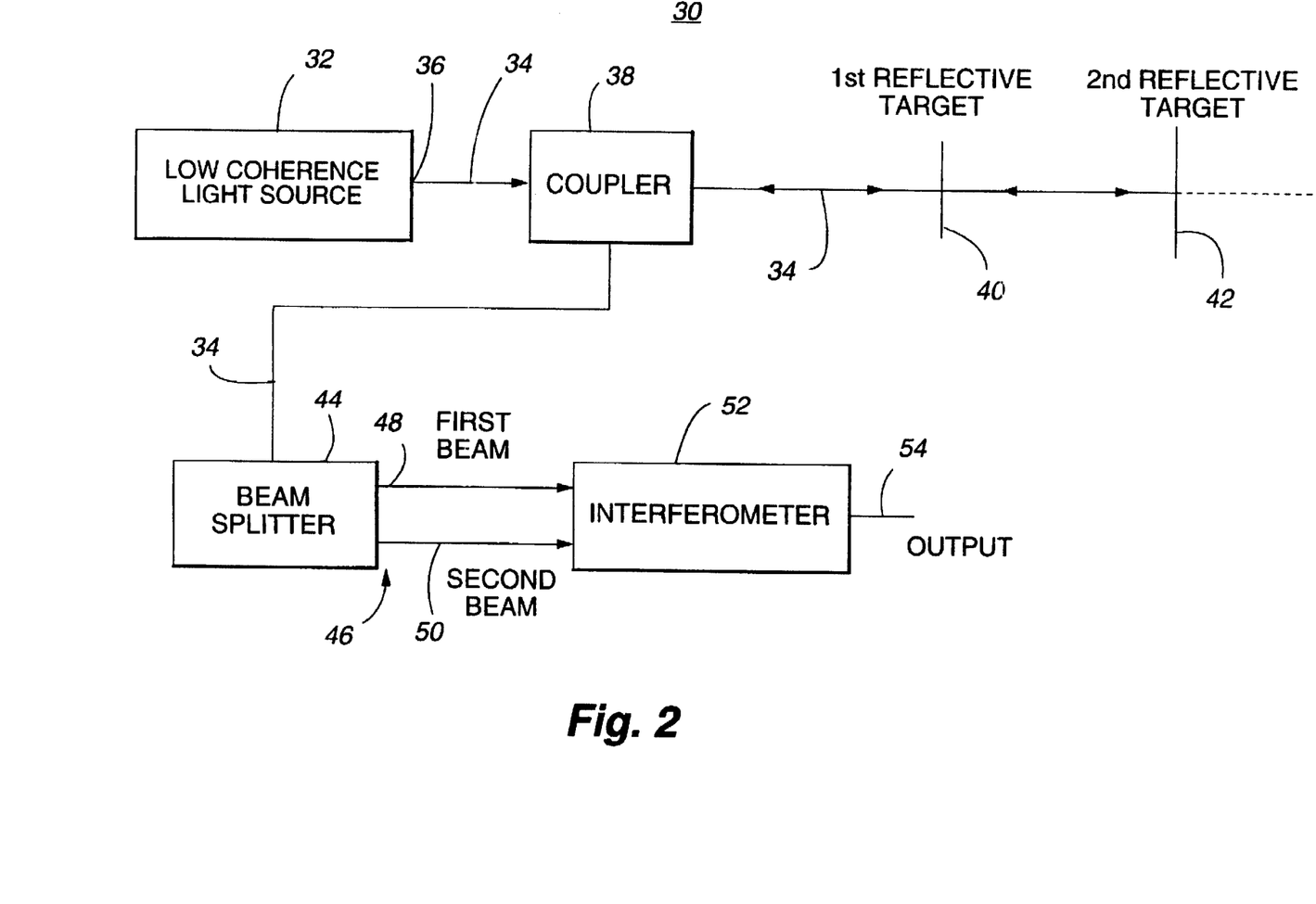
FIG. 2 is a block diagram of a system for measuring a differential rate of change in strain.

FIG. 2 shows a more detailed block diagram of a system 30 for measuring a differential rate of change in strain. A low coherence light source 32 replaces the means for providing a low coherence light source 12. An optical waveguide 34 connects an output 36 of the low coherence light source 32 with an optical coupler 38. The optical waveguide 34 replaces the means for transmitting 16 of FIG. 1. The coupler 38 connects the low coherence light 32 to a first reflective target 40 and a second reflective target 42. The first reflective target 40 produces a first reflective signal and the second reflective target 42 produces a second reflective signal that passes through the coupler 38 to a beam splitter 44. In one embodiment the first reflective target 40 and the second reflective target 42 are partially reflecting minors. In another embodiment, the first and second target are gratings. The beam splitter 44 has at its output 46 a first beam 48 and a second beam 50. The first beam 48 and second beam 50 are combined in an interferometer 52. The interferometer 52 has an interference output (combined signal) 54. The frequency of the interference output 54 is directly proportional to the difference in the time derivative strain between the first reflective target 40 and the second reflective target 42.

Figure 3:
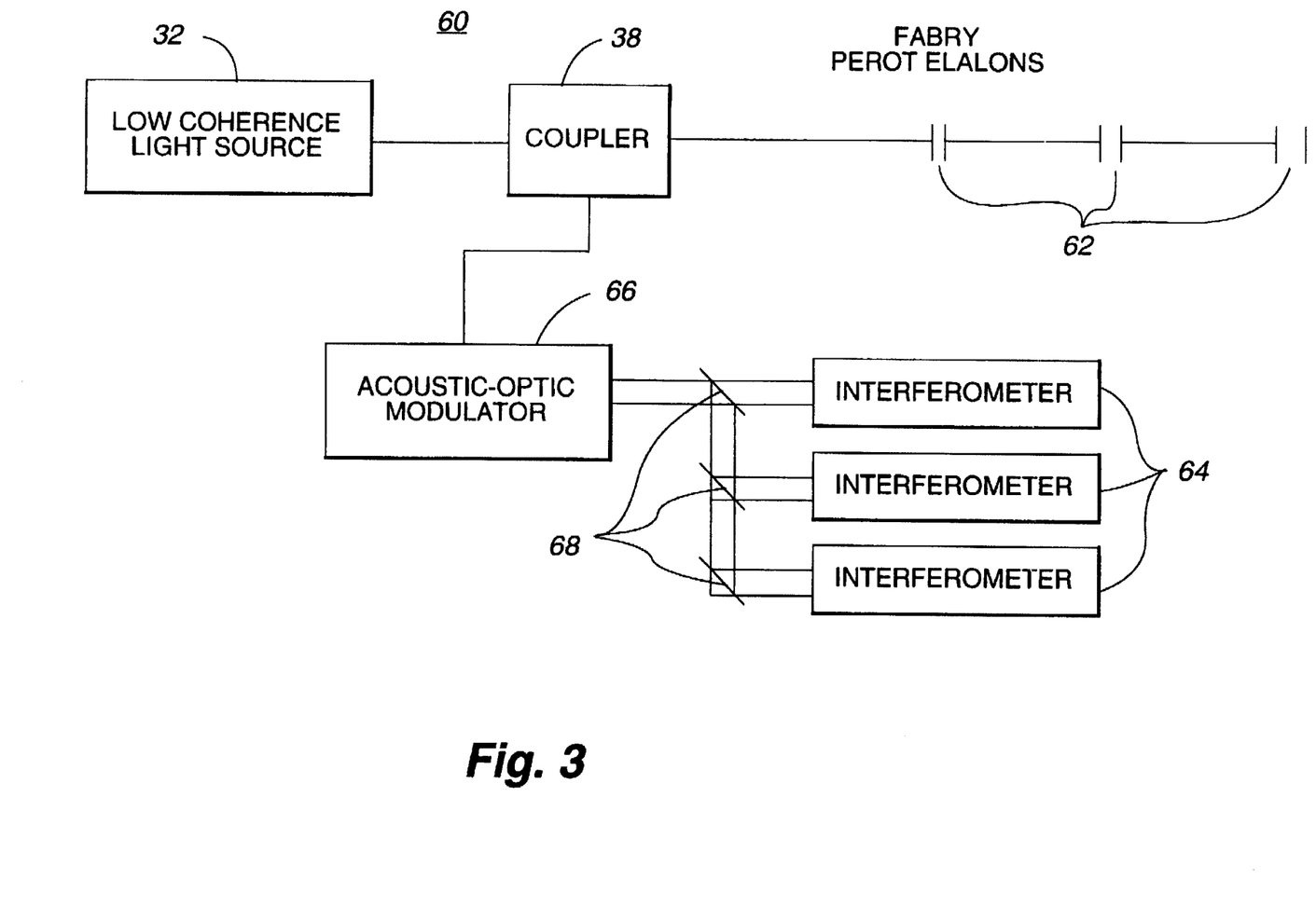
FIG. 3 is a block diagram of an apparatus for determining a differential rate of change of strain in a device.

The apparatus 60 of FIG. 3 is similar to the system 30 of FIG. 2 except the first reflective target 40 and the second reflective target 42 have been replaced by one of a plurality of Fabry-Perot etalons 62 and a plurality of interferometers 64 are used to demodulate the Fabry-Perot etalons 62. A Fabry-Perot etalon is made of two parallel partially reflecting mirrors. The beam splitter 44 of FIG. 2 is replaced with an acousto-optic modulator (frequency shifter or means for frequency shifting light) 66 and a plurality of splitters 68 connect the acousto-optic modulator 66 to the plurality of interferometers 64. Using the apparatus of FIG. 3 it is possible to determine the differential time derivative of strain at several points simultaneously. In another embodiment, the frequency shift is induced by reflecting light off a moving object.

Figure 4:
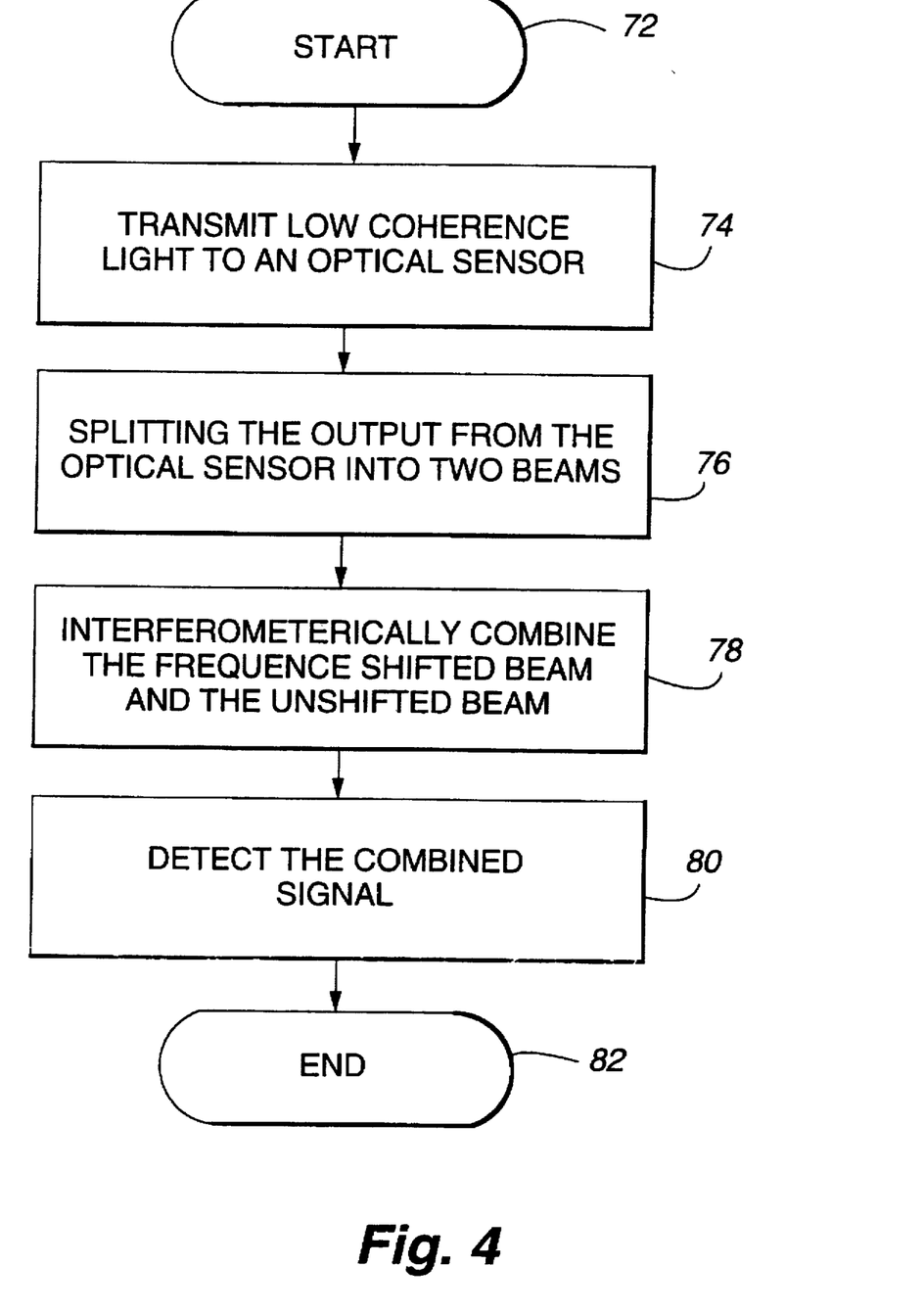
FIG. 4 is a flow diagram of a method for determining the instantaneous rate of change of strain.

The flow diagram of FIG. 4 describes a method 70 for determining the instantaneous rate of change of strain. The method 70 starts at block 72, then low coherence light is transmitted to an optical sensor, at block 74. The output from the optical sensor is split into two beams, at block 76. The output from the beam splitter is interferometerically combined, at block 78. The combined signal is detected at block 80 and the method ends at block 82.

Theory of Operation

Figure 5:
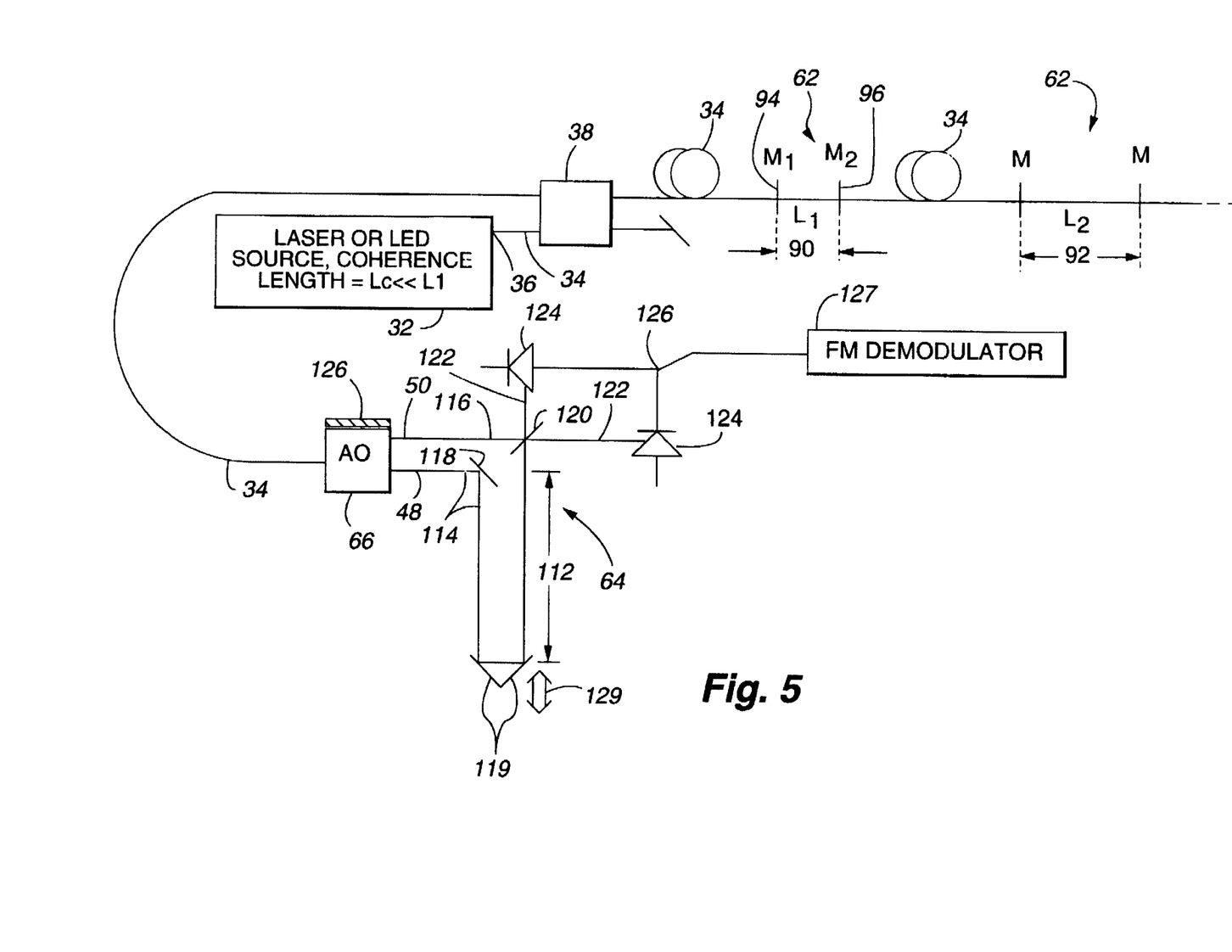
FIG. 5 is a block diagram of another apparatus for determining a differential rate of change of strain in a device.
Figure 6:
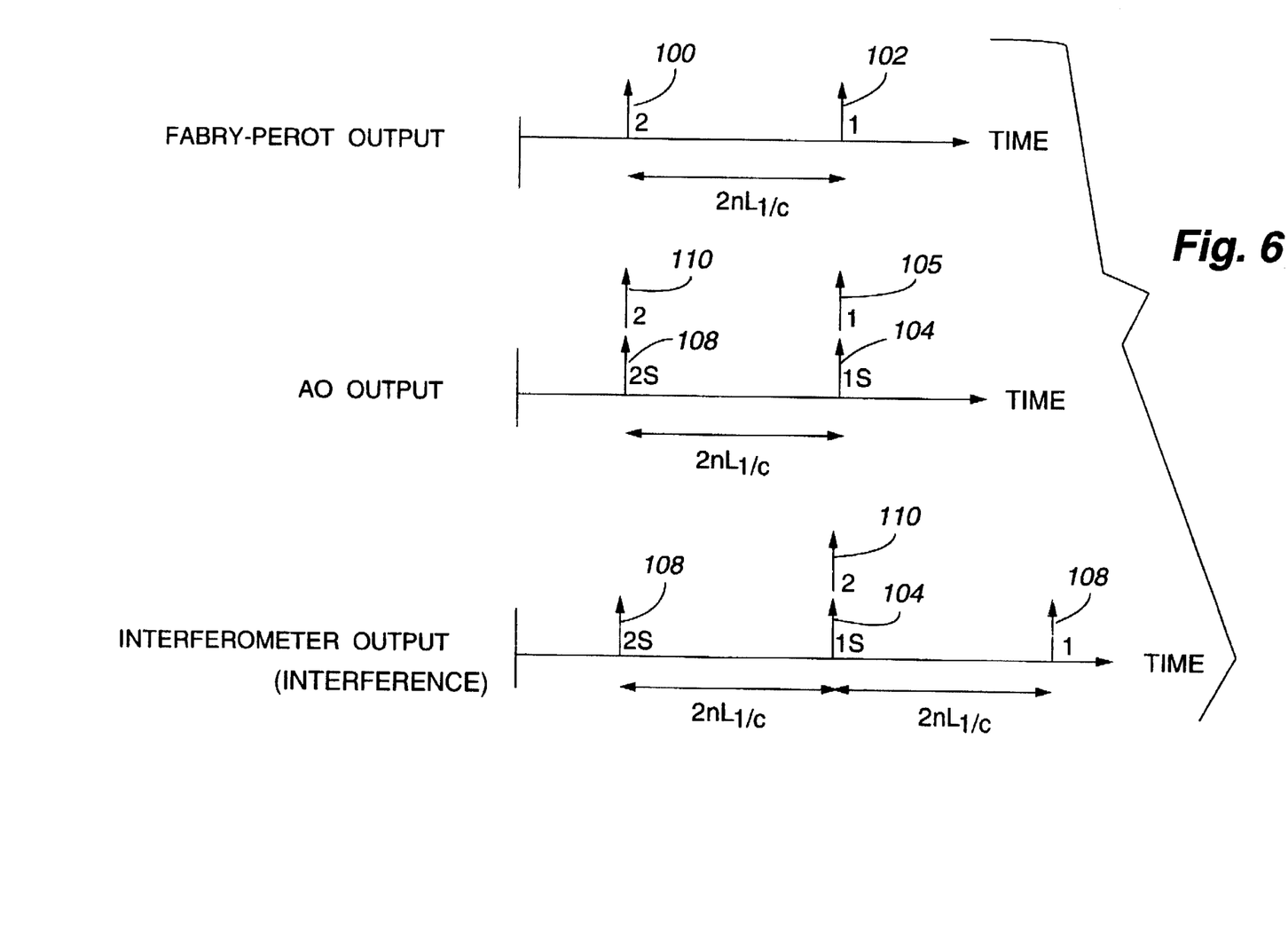
FIG. 6 is a schematic diagram of the relative time positions of the different light paths in the apparatus of FIG. 5.

FIGS. 5 and 6 illustrate the theory behind the invention. The low coherence light source 32 can be either a light emitting diode (LED), a low coherence laser or any incoherent light source. The LED or laser 32 has a coherence length less than an optical path length 90, 92 of the two Fabry-Perot etalons 62. This allows the invention to demodulate the output from the two Fabry-Perot etalons 62 separately with the interferometer (means for discriminating) 64. Coherence theory in optics states that light emanating from a source will only produce an interference pattern if the two portions of light from the source were only separated by a distance less than the coherence length of the source. The results of this principle are shown graphically in FIG. 6. Light emitted at the same time from the source is reflected by the partially reflective mirrors 94, 96. By the time the light has reflected from the second mirror 96 the light reflected from the first mirror 94 is two times the optical path difference ($2nL_1$) between the mirrors ahead. The letter "n" is the index of refraction of the medium between mirrors 94 and 96. This is shown graphically in FIG. 6 by arrows 100 and 102. Time is graphed as moving forward from left to right and arrow 100 represents the reflection from the first mirror 94 ($M_1$) and arrow 102 represent the reflection from the second mirror 96 ($M_2$). In the preferred embodiment the Fabry-Perot etalons 62 will be intrinsic Fabry-Perot etalons and have glass between the mirrors, resulting in an index of refraction of about 1.5. Applying the coherence length principle to the apparatus of FIG. 5, requires that the coherence length of the LED 32 be less than a distance 90, 92 between the two mirrors 94, 96 or reflective targets of the Fabry-Perot etalons 62. In addition, the coherence length of the LED 32 must be less than the difference in the optical path lengths 90, 92 ($L_1$–$L_2$).

The light then passes through the acousto-optic modulator 66, which acts as a beam splitter. In addition, the acousto-optic modulator frequency shifts one of the output beams. As a result, a frequency shifted version (frequency shifted beam)104 of the reflected light from mirror 94 is formed and an unshifted version (unshifted beam)106 of the reflected light from the mirror 94 is formed. Similarly, a frequency shifted version 108 and an unshifted version 110 of the reflected light from the mirror 96 are formed. The light then passes through the interferometer 64. The interferometer 64 has an optical path length difference 112 between the shifted 114 optical path and the unshifted optical path 116 equal to one half the optical path length 90 between the two mirrors 94 and 96 of the first Fabry-Perot etalon. As a result, the shifted versions (shifted beam) or signals 104, 108 are translated back by an optical distance of $2nL_1$. As can be seen in FIG. 6 in the graph labeled interferometer output this places the first shifted signal 104 at the same time as the second unshifted signal 110. Because of the low coherence of the source only the shifted signal 104 from the first mirror 94 will interfere with the second unshifted signal 110 from the second mirror 96 at a detector 124 of the output of the interferometer 64. Theses signals are called a combined signal. The reflections from the mirrors of the other Fabry-Perot etalon 62 will be at least a one coherence length apart and therefore will not produce an interference signal.

The interferometer 64 has a plurality of mirrors 118, 119 that form the frequency shifted light beam path. The shifted light combines with the unshifted light beam 116 at a partially reflecting mirror 120. The two combined signals 122 are detected by a pair of photodiodes 124. The output 126 from the pair of photodiodes 124 is demodulated by an FM demodulator 127. The FM demodulator 127 converts the frequency to a voltage. This voltage is proportional to the difference in the Doppler shift between the pair of mirrors 94, 96. The second Fabry-Perot etalon 62 is demodulated by changing the optical path length difference 112 to match the optical path 92 of the second Fabry-Perot etalon 62. The optical path length difference is varied by moving the mirrors 119 along the direction of the arrow 129

Both of the mirrors 94, 96 induce a Doppler shift proportional to their velocity. The movement of the mirrors 94, 96 is due to the time derivative of the strain of the device to which the mirrors are attached. The Doppler shift affects both the frequency shifted signals 104, 108 and the unshifted signals 106, 110. The interferometer 64 then mixes the signals and the interference output signal has a frequency which is the difference between the two signals 104, 110. In one embodiment the interferometer 64 is a Much Zehnder interferometer. From the foregoing description it is obvious that the acousto-optic modulator 66 just shifts the frequency of the interference signal from zero Hertz to an induced frequency shift. The acousto-optic modulator 66 can be replaced by a standard beam splitter. The advantage of the acousto-optic modulator is that by shifting the interference signal to a positive frequency the apparatus can determine if the strain is positive or negative. Without the acousto-optic modulator the sign of the strain is ambiguous.

The acousto-optic modulator 66 induces a frequency shift in the light that is equal to the frequency of an input transducer (input signal)126. The acousto-optic modulator 66 induces a frequency shift equal to the input transducer's frequency due to conservation of energy. The light is composed of photons having an energy equal to hv, where h is Planck's constant and v is the frequency of the light. The photons collide with the sound composed of phonons having energy equal to hf, where h is Planck's constant and f is the frequency of the sound (i.e., the frequency of the input transducer 126). When the photons and the phonons collide the phonon is annealed and only the photon is left, the resulting photon has to have energy equal to the original phonon and the original photon or an energy h(v+f). This can only occur if the photon's frequency has been shifted by an amount f, the input sound frequency.

Figure 7:
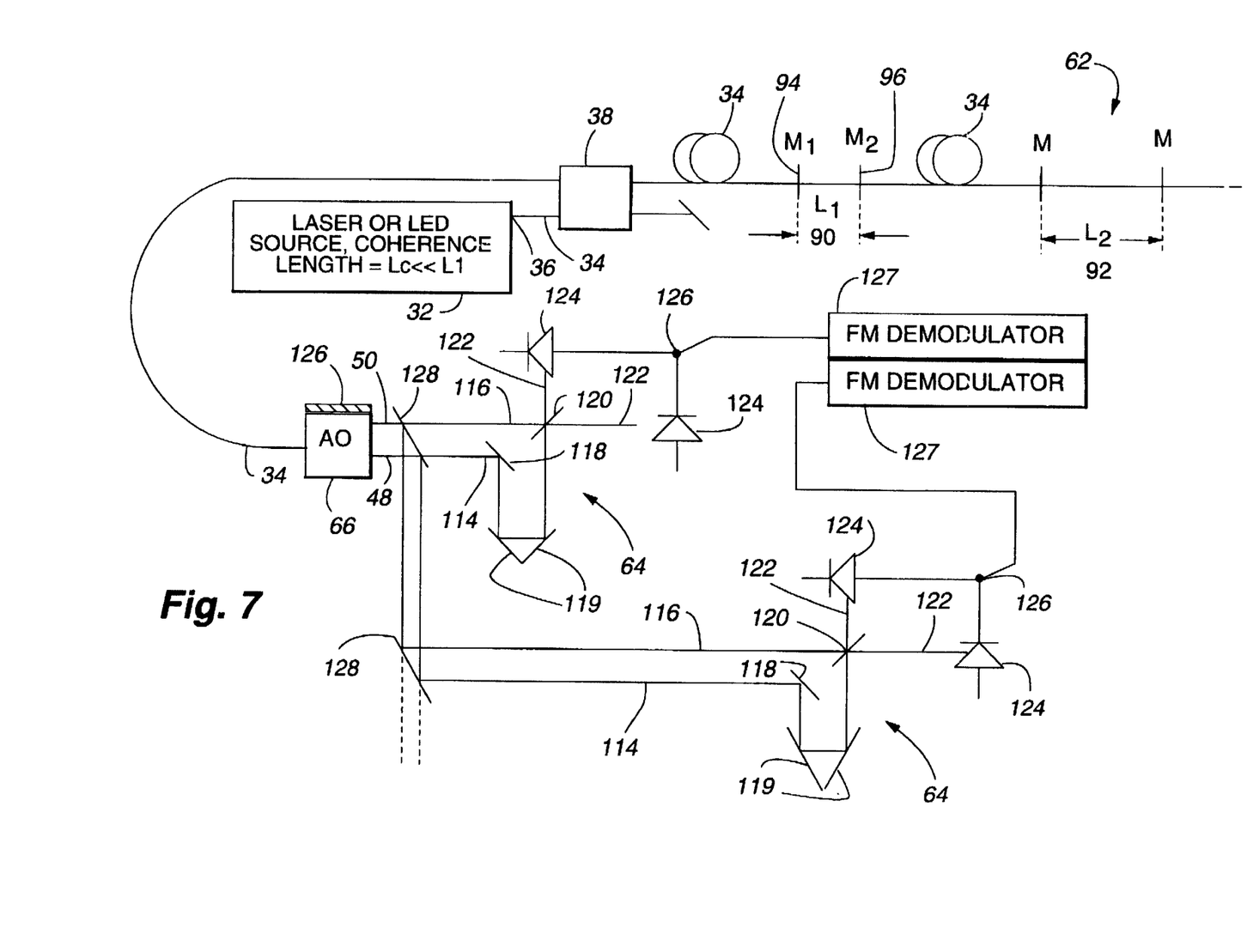
FIG. 7 is a block diagram of an alternative embodiment of the apparatus of FIG. 5.

FIG. 7 is an alternative embodiment of the apparatus of FIG. 5. The only difference between the apparatus of FIG. 5 and FIG. 7 is the addition of a pair of beam splitters 128, an additional interferometer 64 and associated FM demodulator 127. The beam splitters 128 are placed between the acousto-optic modulator 66 and the pair of interferometers 64. The addition of the second interferometer 64 and FM demodulator 127 allows the apparatus of FIG. 7 to demodulate both Fabry-Perot etalons 62 simultaneously.

Figure 8:
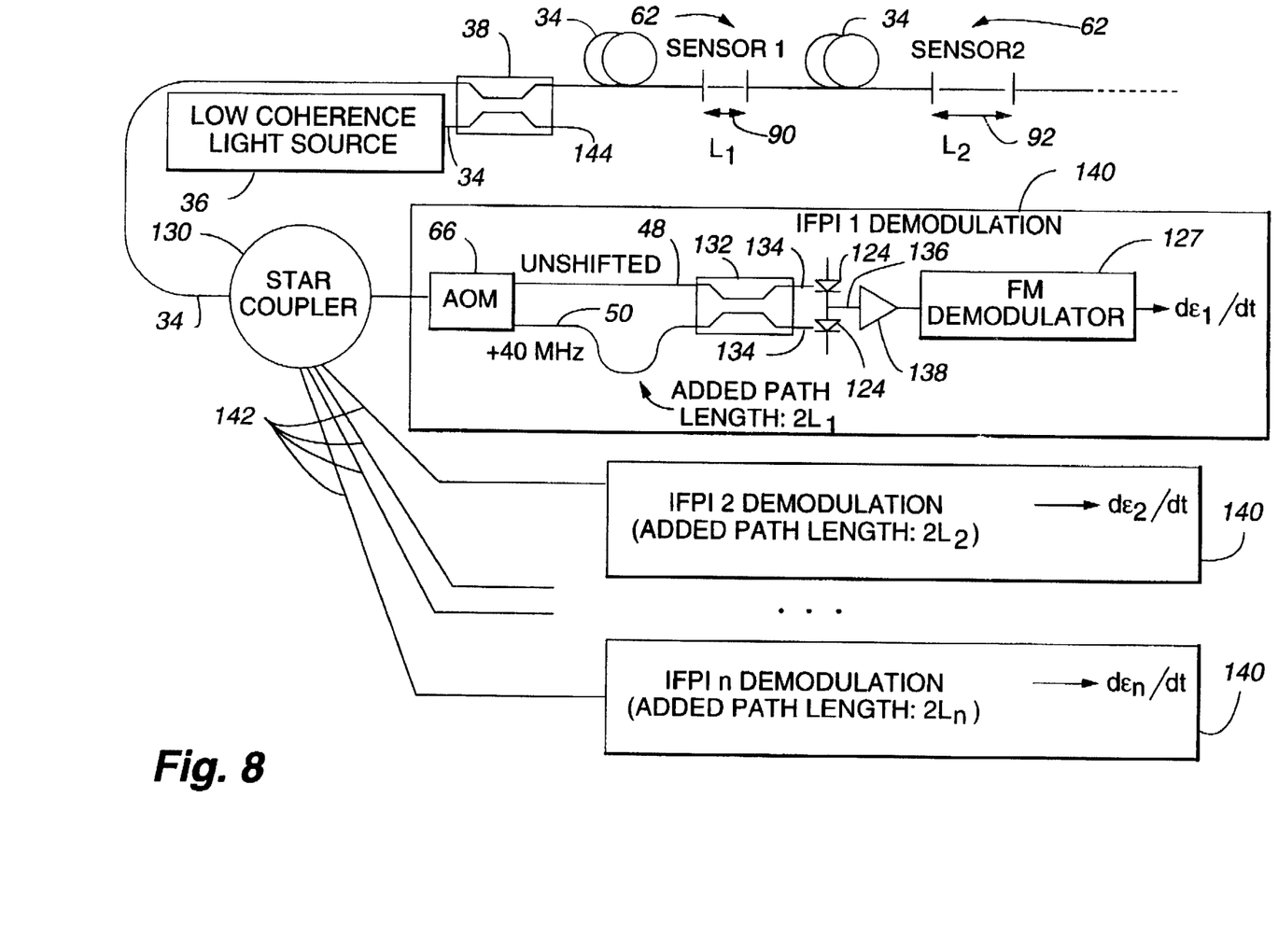
FIG. 8 is a block diagram of an alternative embodiment of the apparatus of FIG. 7.

FIG. 8 is an alternative embodiment of the apparatus of FIG. 7. A star coupler 130 replaces the beam splitters 128 and the star coupler 130 divides the light from the Fabry-Perot etalons 62 before it reaches the acousto-optic modulator 66. As a result a plurality of acousto-optic modulators 66 are required. The acousto-optic modulators 66 divide the light into the unshifted beam 48 and the frequency shifted beam 50. The optical path length difference 112 introduced by the interferometer 64 in FIG. 5 is replicated by having an optical fiber that carries the frequency shifted beam 50 be longer than the optical fiber that carries the unshifted beam 48. A coupler 132 combines the unshifted beam 48 and the shifted beam 50. The output 134 of the coupler is focused on the detectors 124. The output 136 of the detectors 124 is amplified by an amplifier 138. The amplifier 138 is then connected to the FM demodulator 127. The structure 140 from the acousto-optic modulator 66 to the FM demodulator 127 is repeated for each optical link 142 from the star coupler 130. Other possible variations include having a single acousto-optic modulator as in FIG. 7 and using a pair of star couplers to distribute the shifted and unshifted signal. Another variation on the design of FIG. 8 has each of the acousto-optic modulators operating at a different frequency. A single detector is then used to detect the mixed output from the acousto-optic modulators and a single FM demodulator tunes in each channel separately. Finally a second string of sensors 62 could be placed on the other end 144 of the coupler.

Figure 9:
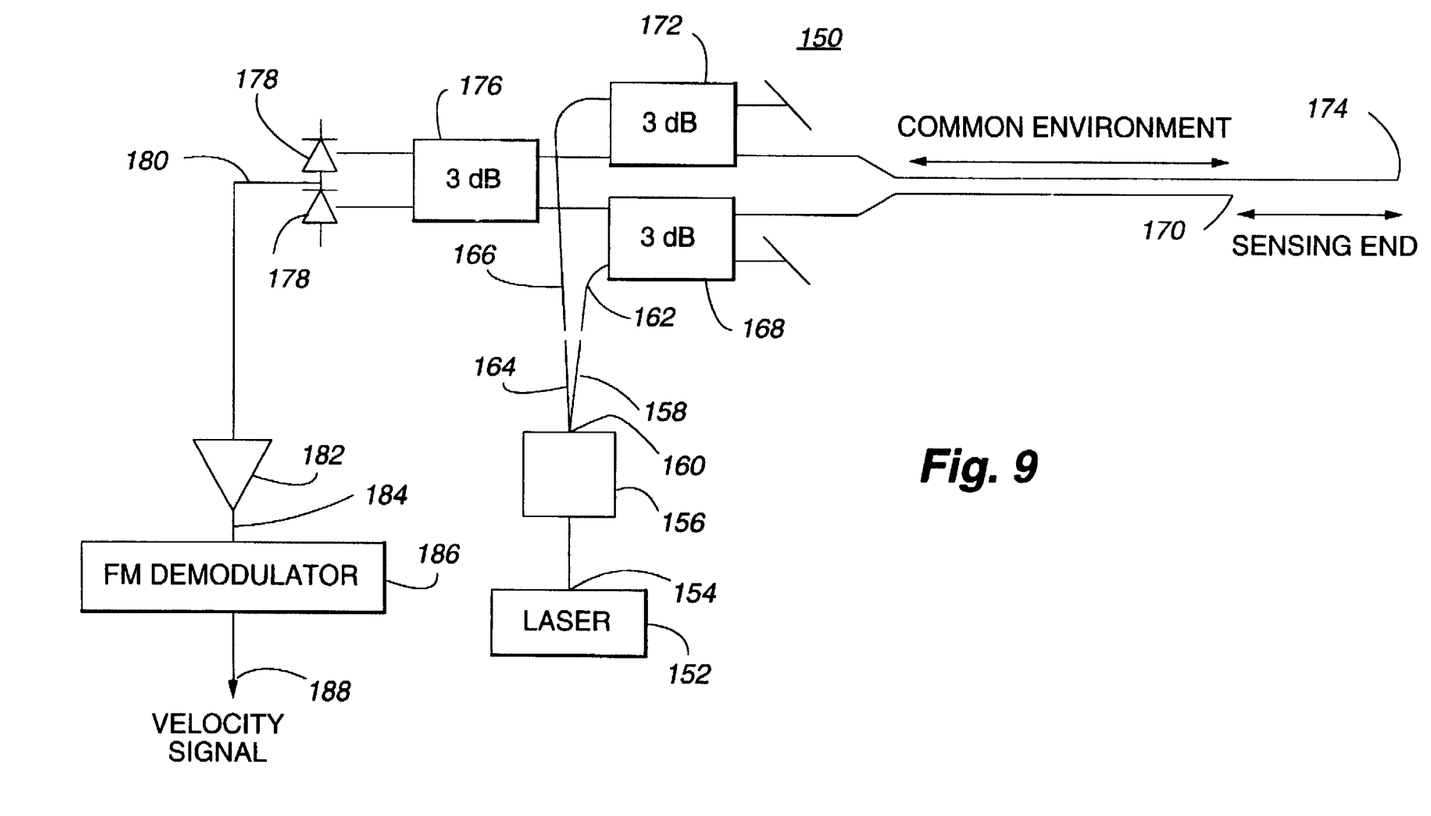
FIG. 9 is a block diagram of alternative embodiment of an apparatus for determining a rate of change of strain in a device.

FIG. 9 represents an alternative embodiment of an apparatus 150 for determining a rate of change of strain in a device. Unlike the other embodiments of the invention the apparatus 150 uses a laser 152 with a long coherence length. An output 154 of the laser 152 is coupled to a beam splitter 156. The beam splitter 156 in one embodiment is an acousto-optic modulator. A first beam 158 from an output 160 of the beam splitter 156 is coupled to a first optical fiber 162. A second beam 164 is coupled to a second optical fiber 166. A first coupler 168 connects the first optical fiber 162 to a first sensor 170. In one embodiment the first sensor 170 is a reflective surface at the end of an optical fiber. A second coupler 172 connects the second optical fiber 166 to a second sensor 174. The reflected signal from the first sensor 170 passes through the first coupler 168 to a third coupler 176. The reflected signal from the second sensor 174 passes through the second coupler 172 to the third coupler 176. The third coupler 176 combines the reflected signals from the first sensor 170 and the second sensor 174 and forms an interference output on the detectors 178. An output 180 from the detectors 178 is amplified by an amplifier 182. The amplified signal 184 is connected to an FM demodulator 186. The output (rate of change of strain signal) 188 of the FM demodulator 186 is the difference in the time derivative strain of the first sensor 170 and the second sensor 174. In another embodiment a single detector 178 is used.

Thus there has been described a system, method and apparatus for determining the differential time derivative of strain at several points along or within a device undergoing strain. By measuring the Doppler frequency shifts the invention can use an FM demodulator to immediately determine the time derivative of the strain. In addition, the signal can be integrated to determine the strain. While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A method for determining an instantaneous rate of change of strain, comprising the steps of:

(a) transmitting low coherence light to an optical sensor;

(b) splitting an output light from the optical sensor into a first beam and a second beam;

(c) interferometrically combining the first beam with the second beam to produce a combined signal;

(d) detecting the combined signal to form a detected combined signal; and (e) frequency demodulating the detected combined signal.

2. The method of claim 1, wherein step (b) involves frequency shifting the first beam.

3. A differential rate of change in strain measuring system, comprising:

a low coherence light source;

a first reflective target illuminated by the low coherence light source, producing a first reflected signal;

a second reflective target illuminated by the low coherence light source, producing a second reflected signal;

a frequency shifter coupled to the first reflective signal and the second reflected signal and having at its output a frequency shifted beam and an unshifted beam; and an interferometer coupled to the frequency shifter, and producing an interference output.

4. The differential rate of change in strain measuring system of claim 3, further including a detector coupled to the interference output.

5. The differential rate of change in strain measuring system of claim 4, further including a frequency demodulator coupled to the detector.

6. The differential rate of change in strain measuring system of claim 3, wherein the low coherence light source has a coherence length less than an optical path length between the first reflective target and the second reflective target.

7. The differential rate of change in strain measuring system of claim 3, further including an optical waveguide coupled to the low coherence light source and coupled the first reflective target.

8. The differential rate of change in strain measuring system of claim 7, wherein the optical waveguide is coupled to the second reflective target and the frequency shifter.

9. The differential rate of change in strain measuring system of claim 3, wherein the first reflective target is a partially reflecting mirror.

10. The differential rate of change in strain measuring system of claim 3, wherein the second reflective target is a partially reflecting mirror.

11. The differential rate of change in strain measuring system of claim 3, wherein the first reflective target and the second reflective target form a Fabry-Perot etalon.

12. The differential rate of change in strain measuring system of claim 3, wherein the beam splitter is an acousto-optic modulator.

13. The differential rate of change in strain measuring system of claim 3, wherein the interferometer is a Mach Zehnder interferometer.

14. The differential rate of change in strain measuring system of claim 3, wherein an optical path length difference of the interferometer is equal to an optical path length difference between the first reflective target and the second reflective target.

15. An apparatus for determining a differential rate of change of strain in a device, comprising:

means for providing a low coherence light;

means for detecting the differential rate of change in strain;

means for transmitting the low coherence light to the means for detecting; and means for demodulating, including a FM demodulator, an output of the means for detecting.

16. The apparatus of claim 15, wherein the means for demodulating includes means for frequency shifting light coupled to the output of the means for detecting.

17. The apparatus of claim 16, wherein the means for demodulating includes means for discriminating coupled to an output of the means for frequency shifting light.

18. The apparatus of claim 17, wherein the means for demodulating includes a photodetector coupled to an output of the means for discriminating.

19. The apparatus of claim 15, wherein the means for providing the low coherence light is a light emitting diode.

20. The apparatus of claim 15, wherein the means for detecting is a Fabry-Perot etalon.

21. The apparatus of claim 15, wherein there are a plurality of Fabry-Perot etalons.

22. The apparatus of claim 15, wherein the means for transmitting is an optical waveguide.

23. An apparatus for determining a differential rate of change in strain in a device, comprising:

a low coherence light source;

an optical coupler connected to the low coherence light source;

an optical fiber coupled to the optical coupler and receiving the low coherence light source;

a plurality of Fabry-Perot etalons inserted along the optical fiber;

an acousto-optic modulator having an input coupled to the optical coupler and having at its output a frequency shifted beam and an unshifted beam; and a plurality of interferometers coupled to an output of the acousto-optic modulator.

24. The apparatus of claim 23, wherein each of the plurality of interferometers has an optical path length that is unique.

25. The apparatus of claim 24, wherein each of the plurality of interferometers has an optical path length difference equal to an optical path length of one of the Fabry-Perot etalons.

26. The apparatus of claim 23, further including a plurality of splitters between the acousto-optic modulator and the plurality of interferometers.

27. An apparatus for determining a rate of change of strain in a device, comprising:

a low coherence light source;

a beam splitter coupled to the low coherence light source having at its output a first beam and a second beam;

a first optical fiber coupled to the first beam;

a second optical fiber longer than the first optical fiber coupled to the second beam;

a coupler connected to the first optical fiber and the second optical fiber and combining the first beam and the second beam a first sensor coupled to an output of the coupler;

a second sensor coupled to an output of the coupler; and a detector coupled to an output of the first sensor and coupled to an output of the second sensor.

28. The apparatus of claim 27, wherein the beam splitter is an acousto-optic modulator.

29. The apparatus of claim 27 wherein the detector is coupled to an FM demodulator.

30. The apparatus of claim 29, wherein an output of the FM demodulator is a rate of change of strain signal.

31. A method of determining a differential time derivative of strain in a device, comprising the steps of:

(a) transmitting a low coherence light at a pair of targets;

(b) receiving a reflected light from the pair of targets;

(c) interferometrically combining the reflected light from the pair of targets; and (d) determining a difference in a Doppler shift between the pair of targets.

\* \* \* \* \*